(No Model.)
G. W. BOYD.
PLANT PROTECTOR.
No. 558,346.  Patented Apr. 14, 1896.
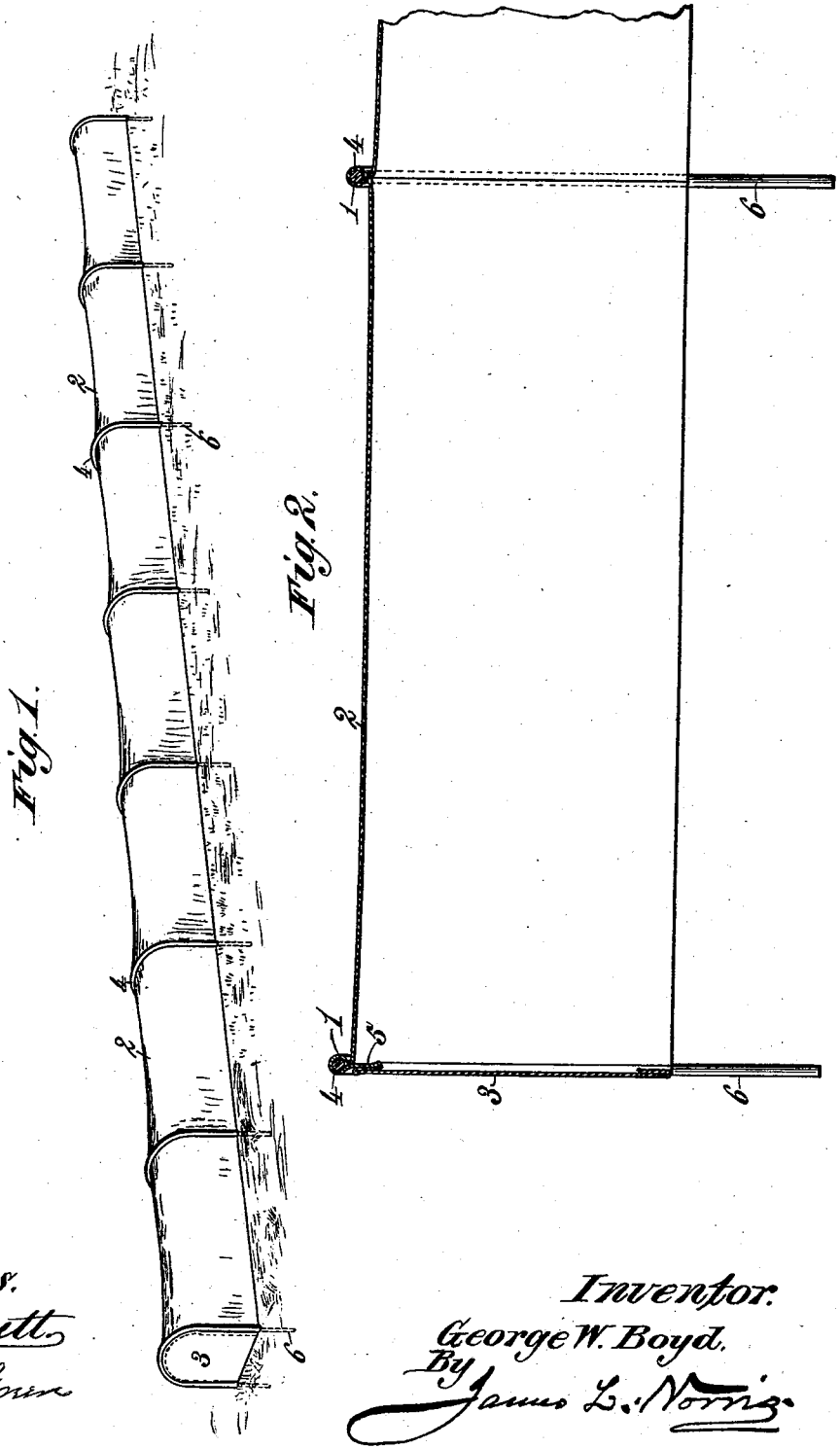
Witnesses.
Robert Evratt
Thos. A. Green
Inventor.
George W. Boyd.
By James L. Norris.
Atty.

UNITED STATES PATENT OFFICE.

GEORGE WASHINGTON BOYD, OF NASHVILLE, TENNESSEE.

PLANT-PROTECTOR.

SPECIFICATION forming part of Letters Patent No. 558,346, dated April 14, 1896.

Application filed January 9, 1896. Serial No. 574,869. (No model.)

*To all whom it may concern:*

Be it known that I, GEORGE WASHINGTON BOYD, a citizen of the United States, residing at Nashville, in the county of Davidson and State of Tennessee, have invented new and useful Improvements in Plant-Protectors, of which the following is a specification.

My invention relates to that class of plant-protectors in which provision is made for the support of suitable protective material above a row of growing plants to shield them against the destructive action of frost, the scorching rays of a summer sun, and other unfavorable weather.

It is the object of my improvements to furnish an effective plant-protector that shall be simple and comparatively inexpensive, durable as well as light, easily handled and capable of being quickly set in position, and which may be readily lifted away from the plants and packed or folded into a small space until its use is again required.

In the annexed drawings, illustrating the invention, Figure 1 is a perspective of my improved plant-protector extended and set in position. Fig. 2 is a longitudinal section along the top and one end of the same.

My plant-protector comprises a number of galvanized-wire arches or supports, designated by the numeral 1, a continuous top and side covering 2, that may consist of cheap cotton cloth or other suitable material, secured to the said supports, and end pieces 3, that may also be made from cotton cloth. The arched supports 1 may have any height and width required, according to the character and size of the plants to be protected. These arches are preferably made from galvanized wire, to guard against rust and corrosion, but any other appropriate material may be employed.

It is desirable to make the protector and its covering 2 in sections of considerable length— say fifty or one hundred feet, more or less, according to the length of the plant-rows to be covered and protected. Thus, by constructing the plant-protector in long sections, the growing plants in a large field or garden can be quickly shielded against the injurious effects of sudden changes in weather, storms, frost, and other destructive agencies. Two boys, for instance, can stretch from fifty to one hundred feet of the protector over a row of plants and press the ends of the wire supports into the soil in a few minutes, and an acre of ground can be covered with the plant-protector in forty or forty-five minutes.

The arched wire supports 1 are preferably arranged throughout the protector at intervals of about three feet, more or less; and in order to securely connect the said supports and the covering 2 the latter is provided with a number of transversely-arranged narrow pockets 4, through which the arched supports are passed. These pockets 4 may be each readily formed by making folds across the cotton or cloth covering 2 at required intervals and stitching the same securely. The arches 1 are readily run through the open seams or pockets 4 and do not need any further fastening.

It is preferable to provide this plant-protector with end pieces 3, before mentioned, to more perfectly exclude wind, rain or, frost and protect the plant from cold. These end pieces 3 may consist of cotton cloth or other suitable material stitched to an end portion 5 of the main covering.

The arched supports 1 are of such length, with relation to the width of the covering 2, that the ends of the supports will project sufficiently to provide legs 6 for insertion into the soil to such depth as will hold the plant-protector in secure position without liability of being blown over.

As the protector is extremely light, even when constructed in sections of fifty feet or more, it can be easily carried in the hands to points in a field or garden where its services are needed. Though of cheap construction, it is very durable and thoroughly effective as a plant-protector, and is able to withstand considerable hard usage. There being no rigid connections between the several arches or supports, each of which is independent of the others except for the flexible cloth covering 2, it is obvious that the protector is collapsible, and therefore easily brought into a small compass for storage or for carrying it from one place to another.

The facility and speed with which this plant-protector may be handled are important advantages. Section after section can be quickly extended and set securely in position, it being only necessary to press the ends of each arched support firmly into the ground, as extension of the protector is effected, and when removal of the device is required it can be as readily taken up and stored away for future use.

The comparatively small cost at which the device can be furnished, owing to simplicity and cheapness of construction, will permit extensive use by people in moderate circumstances, while its effectiveness and reliability as a protection to plants against the injurious and destructive action of frost and vicissitudes of climate will afford the means for a large saving of field and garden products.

What I claim as my invention is—

1. A folding plant-protector, consisting of a flexible longitudinal cover, and a plurality of arched supports secured to the said longitudinal cover at intervals along its length and having their end portions projecting from the lower longitudinal edges of the cover for insertion into the soil, said cover being collapsible between the arched supports to fold the latter closely together, substantially as described.

2. A plant-protector, comprising a number of arched supports, a cloth covering provided at intervals with transverse pockets or open-ended seams to receive the said supports the ends of which are extended beyond said covering to provide legs for insertion into the soil, and cloth end pieces fastened to the ends of the main covering and closing the end arches, substantially as described.

In testimony whereof I have hereunto set my hand in presence of two subscribing witnesses.

GEORGE WASHINGTON BOYD.

Witnesses:
CHAS. BUTLER HALL,
LONNIE. WHITEFIELD.